June 20, 1950     T. D. BOWES     2,512,477
SHIP'S CARGO LOADING GEAR
Filed Feb. 8, 1945     3 Sheets-Sheet 1
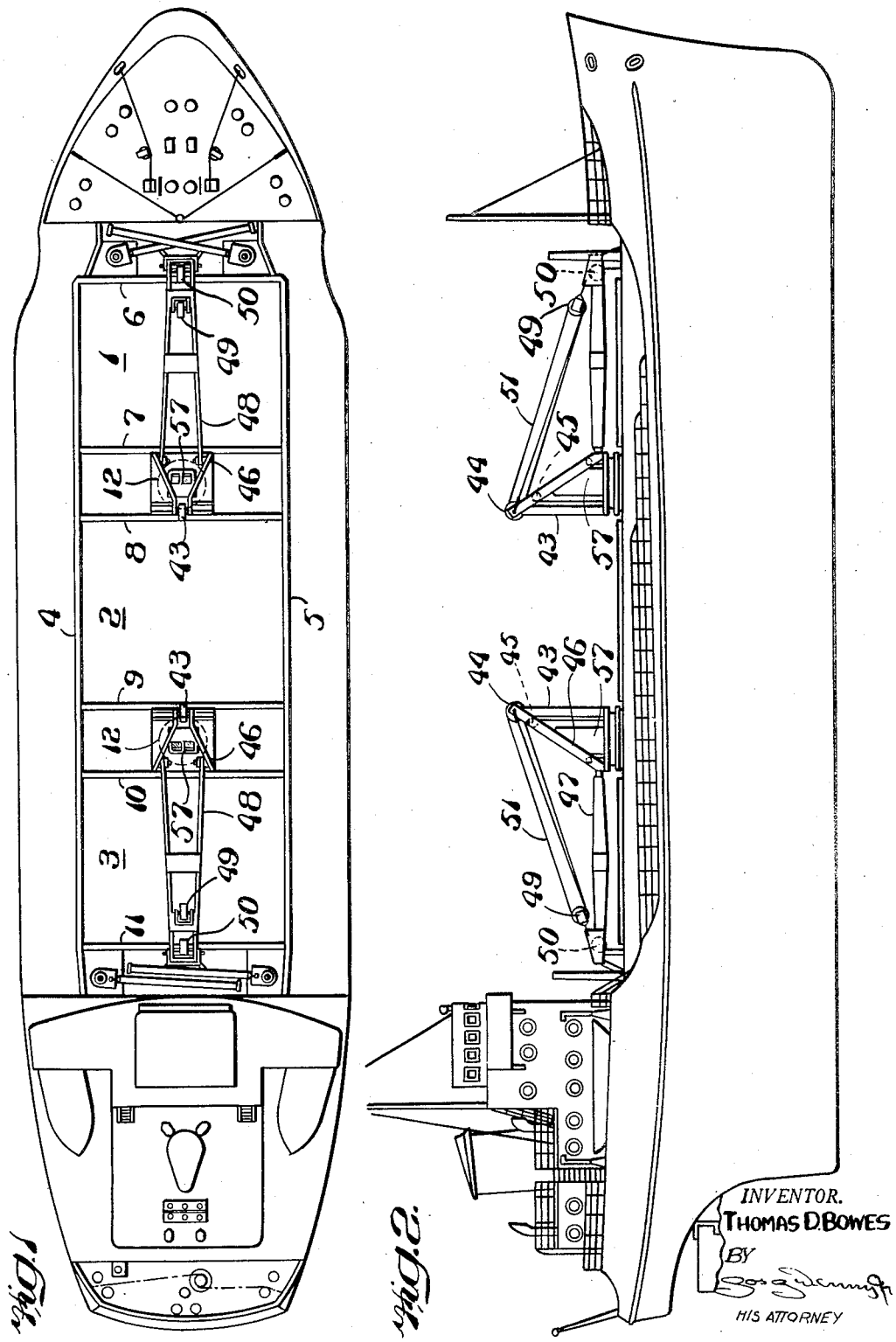
INVENTOR.
Thomas D. Bowes
BY
HIS ATTORNEY June 20, 1950  T. D. BOWES  2,512,477
SHIP'S CARGO LOADING GEAR
Filed Feb. 8, 1945  3 Sheets-Sheet 2

INVENTOR.
THOMAS D. BOWES
BY
HIS ATTORNEY

June 20, 1950     T. D. BOWES     2,512,477
SHIP'S CARGO LOADING GEAR
Filed Feb. 8, 1945     3 Sheets-Sheet 3
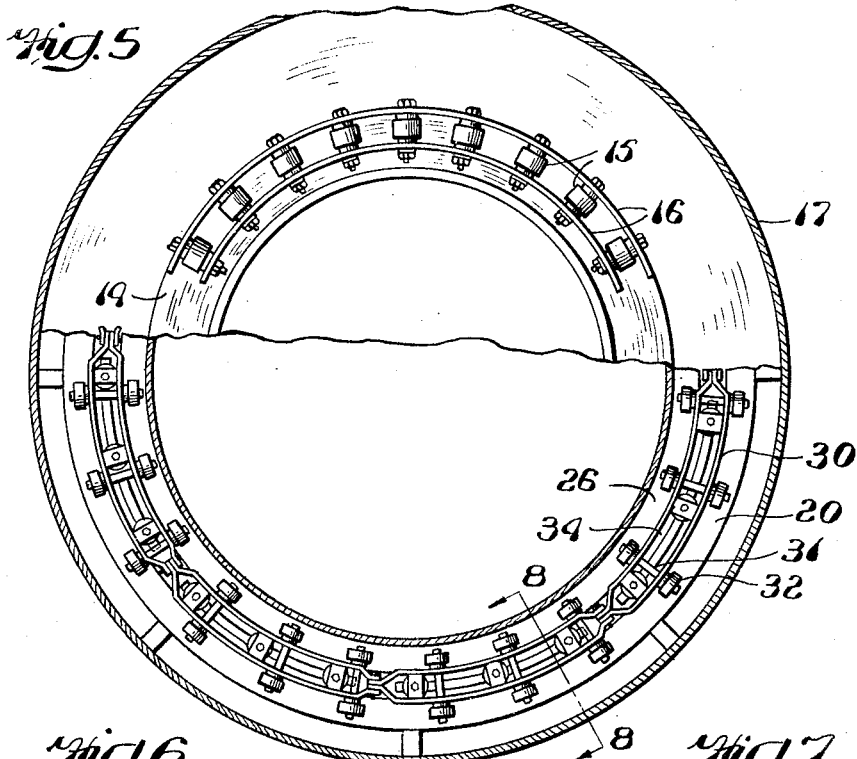
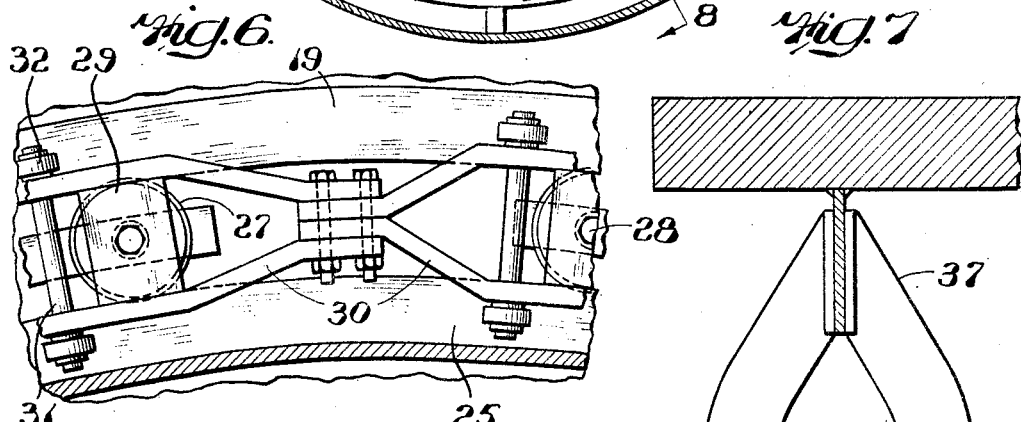
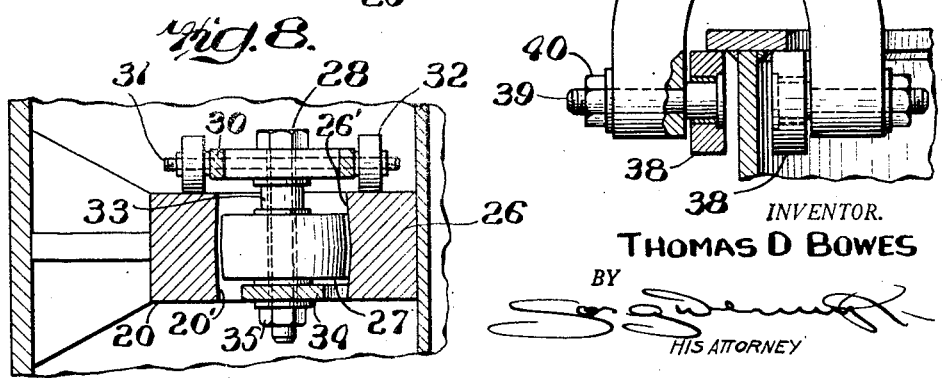
INVENTOR.
THOMAS D BOWES
BY
HIS ATTORNEY Patented June 20, 1950

2,512,477

UNITED STATES PATENT OFFICE 2,512,477

SHIP'S CARGO LOADING GEAR

Thomas D. Bowes, Cynwyd, Pa.

Application February 8, 1945, Serial No. 576,882

5 Claims. (Cl. 212—3)

My invention is an improved ship's cargo loading gear, and a leading object of my invention is to provide a unitary apparatus suitable for expeditious and permanent installation amidships and preferably between cargo holds so that a plurality of holds may be serviced from a single installation. Where a ship contains more than two holds, the intermediate hold may be advantageously made of greater length than the end holds and a loading unit placed between each end hold and the center hold: each unit having a boom of sufficient length to service the end hold and service half or more of the center hold.

In its preferred form, each loading unit comprises a crane mounted upon a rotatable platform forming the top of a rotatable weathertight housing containing and protecting the operating mechanisms for the load and topping cables of the crane. The housing may also contain a motive source for slewing the housing about its vertical axis to shift the crane boom to any desired angular position. The housing is journalled in a fixed casing and so connected therewith that any tendency of the housing to tilt, due to crane loading, is positively resisted without the necessity for a counterbalance.

The characteristic features and advantages of my improvements will appear from the following description and the accompanying drawings in illustration thereof.

Figure 3:
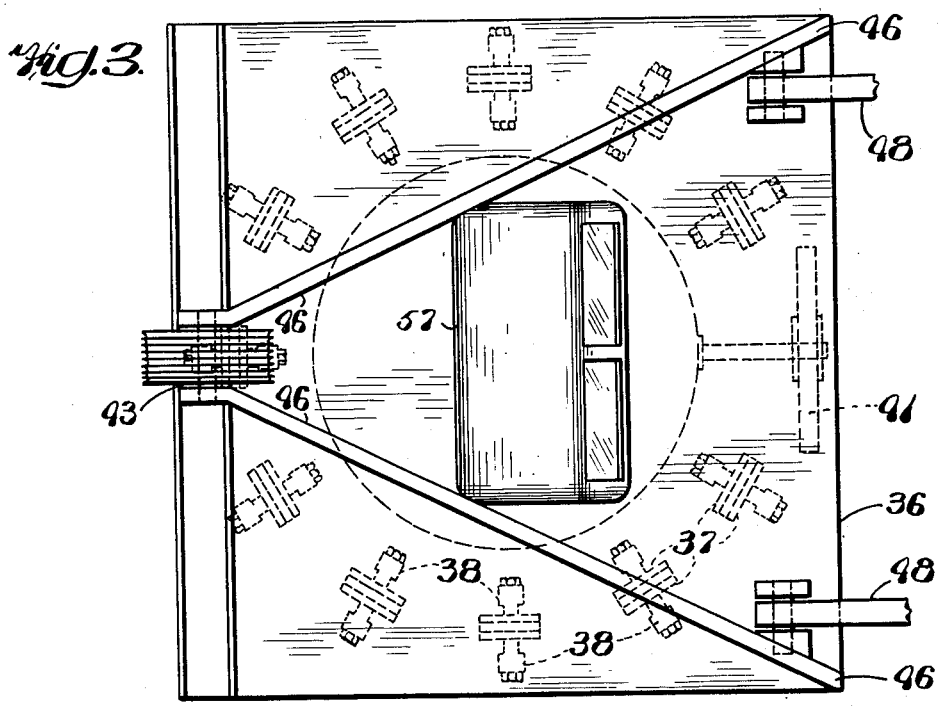
Figure 4:
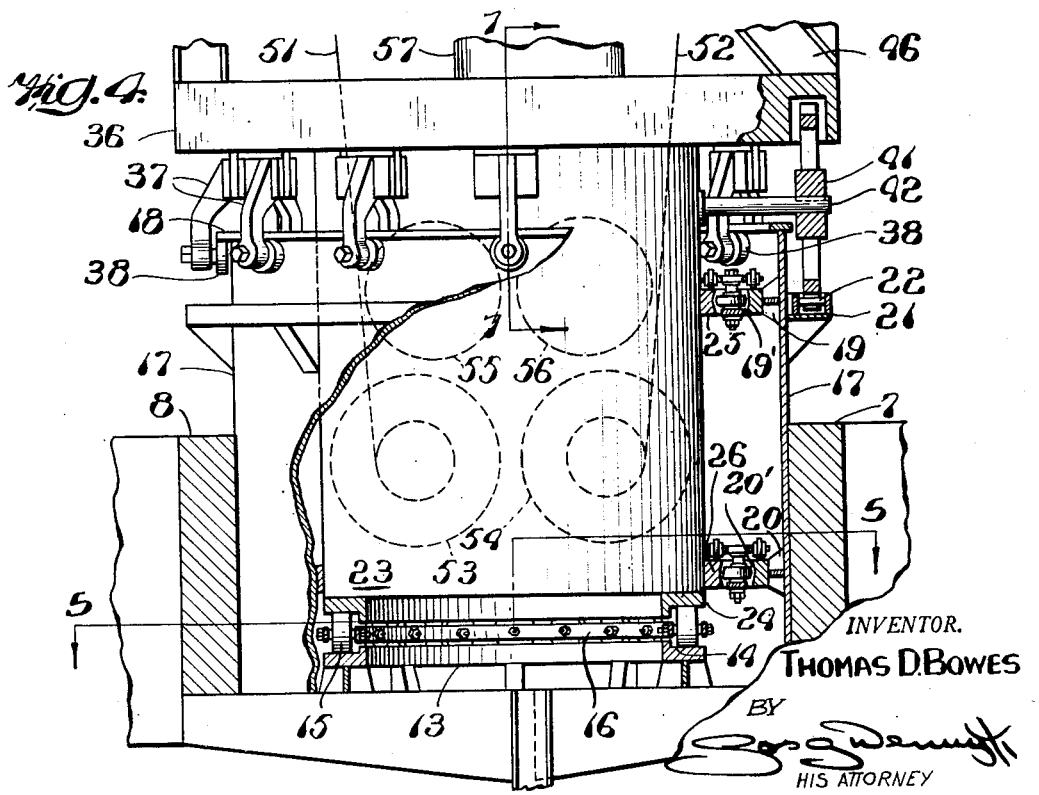

In the drawings, Fig. 1 is a top plan view of a ship having a pair of cargo loading units mounted thereon in accordance with my invention; Fig. 2 is a side elevation of the ship and cargo loading units shown in Fig. 1; Fig. 3 is a fragmentary top plan view of the top of one of the cargo loading units, with parts broken away; Fig. 4 is a vertical sectional view of the cargo loading unit shown in Fig. 3 with parts broken away; Fig. 5 is an irregular horizontal sectional view taken on the line 5—5 of Fig. 4; Fig. 6 is an enlarged fragmentary detached view of a portion of the upper tilt-restraining mechanism embodied in my invention; Fig. 7 is an enlarged fragmentary sectional view taken on the line 7—7 of Fig. 4; and Fig. 8 is an enlarged fragmentary sectional view taken on the line 8—8 of Fig. 5.

In the drawings, I have illustrated cargo loading units embodying my invention mounted on a ship having a hull of any desired construction and containing cargo holds accessible through hatchways 1, 2 and 3, the central hold and hatchway being somewhat longer than the end ones. The side edges of the hatchways are bounded by fore and aft coamings 4 and 6 and the athwartship edges of the hatchways are bouned by coamings 6, 7, 8, 9, 10 and 11, for supporting hatch covers (not shown).

The spaces between the pair of juxtaposed coamings 7 and 8 and between the pair of juxtoposed coamings 9 and 10, as well as beyond the coamings 4, 5, 6 and 11, are covered by permanent deck plates, generally consisting of steel plates secured to rigid deck beams and forming a base.

A cargo loading unit 12 embodying my invention is mounted amidships on the deck sections between the coamings of each pair of coamings 7, 8 and 9, 10. Each unit comprises a base 13 welded or otherwise fixed to the deck section and forming a step bearing 14 providing a circular race ring on which rotates a series of spaced rollers 15 journalled in the annual cage or retainer rings 16.

A metallic casing 17, preferably of cylindrical shape, is welded or otherwise permanently fixed to the deck section and to the coamings 7, 8 (or 9, 10) concentrically with the axis of the cage 16. The casing 17 preferably extends substantially above the tops of the coamings and terminates in a flange 18 forming a T-head on the casing.

A pair of axially spaced rings 19 and 20 are welded, or otherwise firmly fixed, to the inner peripheral surface of the casing 17 intermediate the top and bottom thereof; each of these rings having an axially concave surface 19' or 20' adapted to form a spheroidal raceway. An annular channel member 21 is welded, or otherwise securely fixed, to the external periphery of the casing 17 adjacent to the upper portion thereof and contains an annular rack 22 with upwardly projecting teeth.

A housing, preferably in the form of a metallic, cylindrical, weather-tight tank 23, is telescoped within the casing 17 and provided with an annular bottom step bearing 24 which rests on the rollers 15. The external periphery of the tank has fixed thereto bearing rings 25 and 26 having, respectively, axially concave faces 25' and 26' complementary to the faces 19' and 20' and forming therewith races for rollers 27 suspended on pintles 28 from cross pieces 29 of flexible, annular cages. Each of the cages comprises pivotally conected, tapering links 30 supported by axles 31 on which are journalled rollers 32 riding on the top faces of the respective pairs of race rings 19, 25 and 20, 26. Axial movement of the rollers 27 on the bolts 28 may be limited by washers 33 and the curved straps 34 which are held in place by nuts 35.

The top of the tank 23 forms a rectangular platform 36 having a series of bifurcated hangers 37 depending therefrom and embracing the upper portion of the casing 17. Each furcation of each hanger 37 has a rotatable roller 38 secured thereto by a radially disposed bolt 39 and nut 40. The rollers 38 engage the under surfaces of the flange 18 and form with the hangers 37 hooks preventing upward axial displacement of the tank 23 relatively to the casing 17 but permitting free rotation of the tank.

The antifrictional mounting of the cylindrical housing 23 within the casing 17, above described, permits the free and easy rotation of the housing 23 within the casing but effectively prevent any tilting or axial displacement of the housing. The housing may be rotated in any suitable manner, as for instance by the engagement of a pinion or cogwheel 41 with the rack 22; the pinion 41 being mounted on a shaft 42 revoluble by an electric motor within the housing 23.

The platform 36 has fixed thereto a short, vertical post 43 provided with sheaves 44 and 45 and having its top rigidly positioned by a diagonally inclined A-frame 46 having its feet secured to the platform 36 at the opposite side thereof from the post 43.

A boom 47 has diverging legs 48 pivotally connected with the platform 36 adjacent to the feet of the A-frame. A link pivoted to the outer end of the boom 47 has journalled thereon a sheave 49 for the topping cable 51, and the outer end of the boom has journalled thereon a sheave 50 for the load cable 52 which runs through a usual tackle block for supporting a loading hook (not shown). The cables 51 and 52 are wound on the topping cable drum 53 and load cable drum 54. The topping cable drum is operable by an electric topping motor and control 55 and the load cable drum is operable by an electric load motor and control 56 housed within the tank 23 and controlled by switches (not shown) in the cab 57 mounted on the platform 36 between the legs 46 of the A-frame.

It will be understood that in loading or unloading a vessel, the elevations of the booms and the positions of the tackle block and hook (not shown) are regulated from the cab 57 by controlling the backward or forward rotation of the motors 55 and 56, and that the housing 23, platform 36, and crane mounted thereon may be turned to any desired angle by slewing the housing by rotating the gear 41 on the rack 22.

My improvements permit the booms as well as the posts to be made relatively short without impairing efficiency, and by locating the loading mechanisms between adjacent hatchways, they may be used for removing, stacking or replacing hatch covers, for loading or unloading either hold, and the work may be carried on so as to fill or empty all the holds substantially at the same time. When not in use, the booms may be lashed in fore and aft positions above the hatch covers and interpose little or no obstruction to visibility, to passage under bridges or to deck loading. When lashed fast, the loading mechanisms provide supports to which deck cargo may be secured.

Having described my invention I claim:

1. Cargo loading gear comprising a base containing a plurality of hatchways bordered by coamings, a casing fixed on said base between and held by said coamings, a weather-tight cylindrical hollow tank surrounded by said casing, anti-tilt-transmitting members connecting said tank and casing, means for rotating said tank, a crane carried by said tank, and crane-motive mechanism enclosed in said tank.

2. A cargo loading mechanism comprising a casing, a housing rotatable within said casing, a crane mounted on said housing, complementary race rings secured to the housing and casing, anti-friction devices between said race rings, a cage from which said devices are suspended, axles extending radially of the axis of said race rings and supporting said cage, and rollers on the ends of said axles and engaging the upper surfaces of said race rings.

3. A cargo loading gear comprising a base forming a bearing, a hollow tank rotatable on said bearing, and having a substantially vertical cylindrical wall, a housing concentric with said tank and having a cylindrical wall with substantially vertical inner and outer faces, and a rim around the upper portion of said wall, hangers connected with said tank and having legs straddling said housing wall and overlying the inner and outer walls thereof and having rollers for engaging the under surface of said rim to limit the movement of said tank away from said bearing, and a crane carried by said tank.

4. A cargo loading gear comprising a base forming a bearing, a hollow tank rotatable on said bearing and having a substantially vertical cylindrical wall, a housing concentric with said tank and having a cylindrical wall with substantially vertical inner and outer faces, complementary, concentric bearings respectively carried by said tank wall and housing wall, antifriction rollers between said bearings, connectors extending substantially vertically along the walls of said tank and housing and limiting relative axial movement thereof, a crane carried by said tank, and crane operating mechanism housed within said tank and shielded from weather thereby.

5. A cargo loading mechanism comprising a base forming a race, a weathertight tank having a bottom member forming a race complementary to said first named race, anti-friction devices between said races, an anchored casing surrounding said tank and having a ring forming a track around the upper portion thereof, anti-friction devices suspended from said tank and engaged beneath said track, race rings secured to the upper portions and lower portions of the tank and casing and arranged in complementary pairs, anti-friction devices between the race rings of the respective pairs, a peripheral track around the upper portion of said casing, a driving wheel connected with said tank and engaging said last named track, a crane mounted on said tank and crane operating mechanism within said tank.

THOMAS D. BOWES.

REFERENCES CITED

The following references are of record in the file of this patent:

UNITED STATES PATENTS

| Number | Name | Date |
| --- | --- | --- |
| 22,811 | Jones | Feb. 1, 1859 |
| 1,023,006 | Carriker | Apr. 9, 1912 |
| 1,235,768 | Cornbrooks | Aug. 7, 1917 |
| 1,549,508 | Robinson | Aug. 11, 1925 |
| 1,560,194 | Armstrong | Nov. 3, 1925 |
| 1,598,723 | Holmes | Sept. 7, 1926 |
| 1,697,261 | Daughs | Jan. 1, 1929 |
| 1,706,441 | Daughs | Mar. 26, 1929 |
| 1,917,053 | Nelson et al. | July 4, 1933 |
| 1,939,037 | Bogert | Dec. 12, 1933 |
| 2,071,905 | Smith | Feb. 23, 1937 |
| 2,139,960 | Kauffman | Dec. 13, 1938 |
| 2,272,949 | Kidder | Feb. 10, 1942 |
| 2,272,958 | Weise | Feb. 10, 1942 |
| 2,313,084 | Manly | Mar. 9, 1943 |
| 2,354,182 | Christoffersen | July 25, 1944 |
| 2,355,235 | Nickles | Aug. 8, 1944 |

FOREIGN PATENTS

| Number | Country | Date |
| --- | --- | --- |
| 16,558 | Norway | Dec. 13, 1906 |